(12) United States Patent
Chang et al.

(10) Patent No.: US 9,036,273 B2
(45) Date of Patent: May 19, 2015

(54) MOBILE DEVICE AND OPTICAL IMAGING LENS THEREOF

(71) Applicant: GeniuS Electronic Optical Co., Ltd., Taichung (TW)

(72) Inventors: Kuo-Wen Chang, Taichung (TW); Poche Lee, Taichung (TW); Wei-Yu Lo, Taichung (TW)

(73) Assignee: Genius Electronic Optical Co., Ltd. (TW)

( * ) Notice: Subject to any disclaimer, the term of this patent is extended or adjusted under 35 U.S.C. 154(b) by 53 days.

(21) Appl. No.: 13/779,727

(22) Filed: Feb. 27, 2013

(65) Prior Publication Data

US 2014/0104700 A1    Apr. 17, 2014

(30) Foreign Application Priority Data

Oct. 12, 2012  (TW) .............................. 101137762 A

(51) Int. Cl.
| | | |
|---|---|---|
| G02B 9/60 | (2006.01) | |
| G02B 13/00 | (2006.01) | |
| G02B 7/08 | (2006.01) | |

(52) U.S. Cl.
CPC .............. G02B 13/0045 (2013.01); G02B 7/08 (2013.01)

(58) Field of Classification Search
CPC ........................................................ G02B 9/60
USPC ......................................................... 359/763
See application file for complete search history.

(56) References Cited

U.S. PATENT DOCUMENTS

| | | | |
|---|---|---|---|
| 7,480,105 B2 | 1/2009 | Mori | |
| 8,179,614 B1 | 5/2012 | Tsai | |
| 2010/0033616 A1 | 2/2010 | Huang et al. | |
| 2010/0214467 A1* | 8/2010 | Ohtsu ........................... | 348/345 |
| 2010/0253829 A1 | 10/2010 | Shinohara | |
| 2010/0254029 A1 | 10/2010 | Shinohara | |
| 2011/0013069 A1 | 1/2011 | Chen | |
| 2011/0134305 A1* | 6/2011 | Sano et al. ..................... | 348/340 |
| 2011/0176049 A1 | 7/2011 | Hsieh et al. | |
| 2011/0249346 A1 | 10/2011 | Tang et al. | |
| 2011/0316969 A1 | 12/2011 | Hsieh et al. | |
| 2012/0069455 A1 | 3/2012 | Lin et al. | |
| 2012/0087019 A1 | 4/2012 | Tang et al. | |

(Continued)

FOREIGN PATENT DOCUMENTS

| | | |
|---|---|---|
| CN | 101308240 | 11/2008 |
| CN | 102047165 | 5/2011 |
| JP | 2010079296 | 4/2010 |

(Continued)

OTHER PUBLICATIONS

Office action from Taiwan patent application No. 23767485 dated Apr. 19, 2014.

(Continued)

*Primary Examiner* — Joseph P Martinez
(74) *Attorney, Agent, or Firm* — Baker & McKenzie LLP

(57) ABSTRACT

Present embodiments provide for a mobile device and an optical imaging lens thereof. The optical imaging lens comprises five lens elements positioned sequentially from an object side to an image side. Though controlling the convex or concave shape of the surfaces and/or the refracting power of the lens elements, the optical imaging lens shows better optical characteristics and the total length of the optical imaging lens is shortened.

13 Claims, 21 Drawing Sheets

(56) References Cited

U.S. PATENT DOCUMENTS

| | | |
|---|---|---|
| 2012/0087020 A1 | 4/2012 | Tang et al. |
| 2012/0105704 A1 | 5/2012 | Huang et al. |

FOREIGN PATENT DOCUMENTS

| | | |
|---|---|---|
| JP | 2010197665 | 9/2010 |
| JP | 2010224521 | 10/2010 |
| JP | 2010256608 | 11/2010 |
| JP | 2010256608 A | 11/2010 |
| JP | 2011141396 A | 7/2011 |
| JP | 2012008164 | 1/2012 |
| JP | 2012037763 | 2/2012 |
| JP | 2012189893 | 10/2012 |
| JP | 2012190037 A | 10/2012 |
| JP | 2013190574 | 9/2013 |
| TW | M369459 | 11/2009 |
| TW | 201202780 A | 1/2012 |
| TW | 201227044 | 3/2012 |
| TW | 201213926 | 4/2012 |
| TW | 201224570 A | 6/2012 |
| TW | 201227043 | 7/2012 |
| TW | 201237455 A | 9/2012 |
| TW | I390244 B | 3/2013 |
| WO | 2010024198 | 3/2010 |
| WO | 2010143459 | 12/2010 |
| WO | 2011021271 A1 | 2/2011 |
| WO | 2011027690 | 3/2011 |

OTHER PUBLICATIONS

Official Action from Japan patent application No. 2013194140 dated Aug. 26, 2014.

Official Action from China patent application No. 2012103855604 dated Jul. 1, 2014.

\* cited by examiner

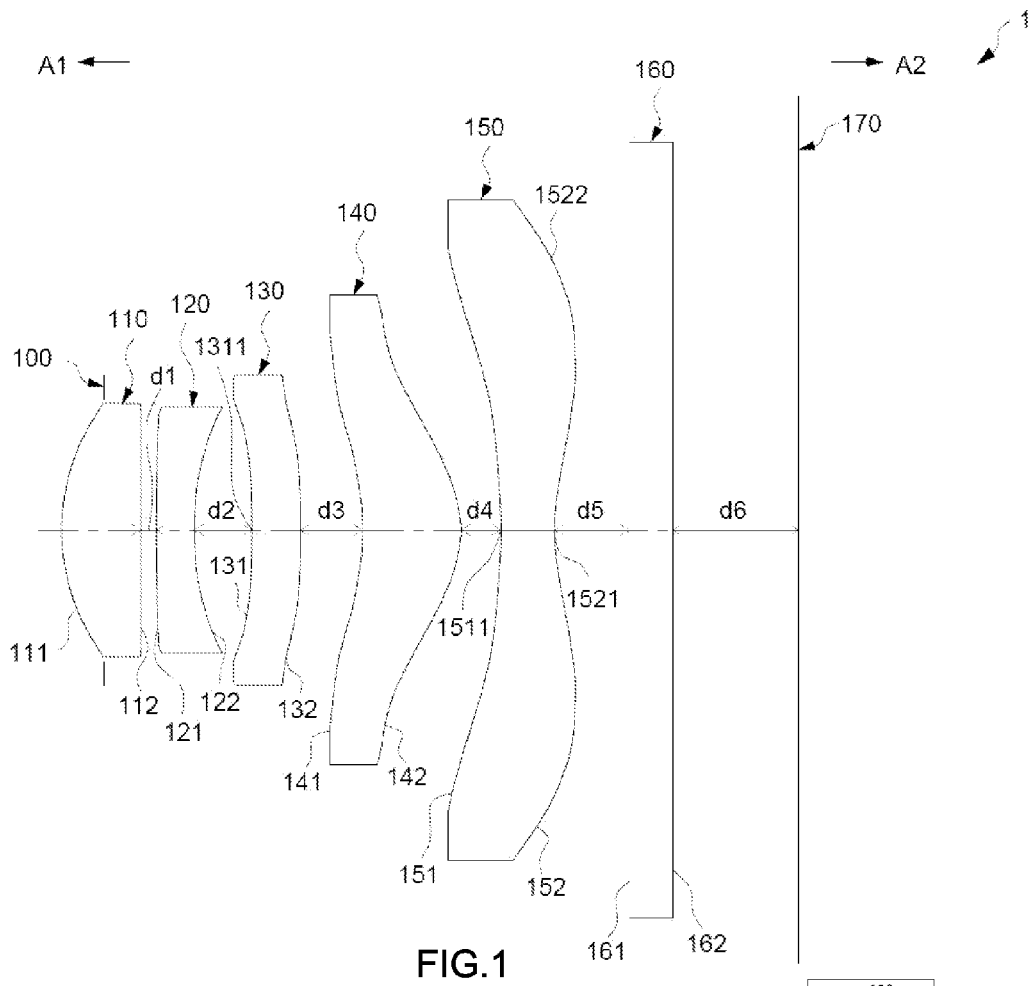
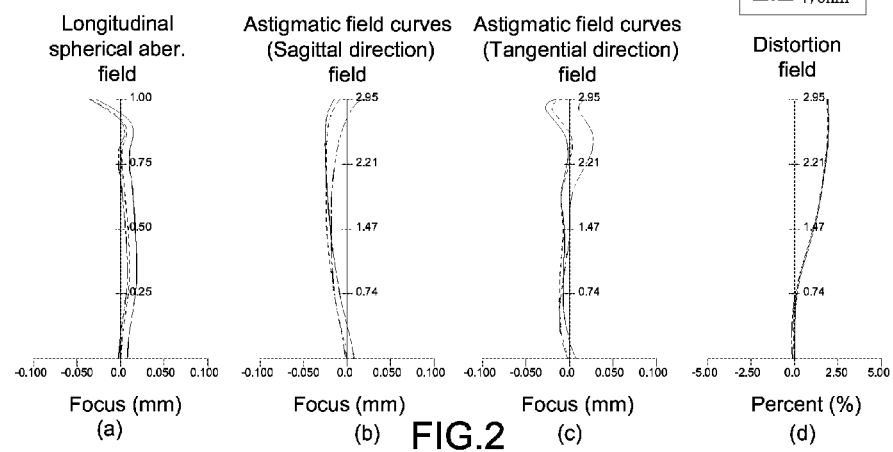
FIG.2

| f(Focus)=4.20 mm, HFOV ( Half angular field of view)= 34.29 deg. | | | | | | | |
|---|---|---|---|---|---|---|---|
| Surface # | | Radius | Thickness | Refractive index | Abbe number | Material | Focus |
| - | Object | ∞ | 600.00000 | | | | |
| 100 | Aperture stop | ∞ | -0.296 | | | | |
| 111 | 1st lens element | 1.441 | 0.544 | 1.544 | 56.114 | Plastic | 2.489 |
| 112 | | -20.639 | 0.100 | | | | |
| 121 | 2nd lens element | 19.249 | 0.260 | 1.637 | 23.340 | Plastic | -3.727 |
| 122 | | 2.103 | 0.386 | | | | |
| 131 | 3rd lens element | -20.563 | 0.330 | 1.637 | 23.340 | Plastic | 29.328 |
| 132 | | -9.851 | 0.424 | | | | |
| 141 | 4th lens element | -2.070 | 0.665 | 1.536 | 55.699 | Plastic | 2.282 |
| 142 | | -0.855 | 0.278 | | | | |
| 151 | 5th lens element | -3.687 | 0.369 | 1.536 | 55.699 | Plastic | -2.080 |
| 152 | | 1.655 | 0.503 | | | | |
| 161 | IR cut filter | ∞ | 0.300 | | | | |
| 162 | IR cut filter | ∞ | 0.692 | | | | |
| 170 | Image plane | ∞ | 0.004 | | | | |

FIG.4

| Aspherical parameters | | | | | |
|---|---|---|---|---|---|
| Surface # | 111 | 112 | 121 | 122 | 131 |
| N | 1.0000E+00 | 1.0000E+00 | 1.0000E+00 | 1.0000E+00 | 1.0000E+00 |
| K | -4.5241E+00 | 0.0000E+00 | 0.0000E+00 | -7.4255E+00 | 0.0000E+00 |
| a4 | 1.8861E-01 | 5.2845E-02 | 6.5064E-03 | 5.9582E-02 | -1.9638E-01 |
| a6 | -7.8791E-02 | -2.5582E-02 | 1.0320E-01 | 6.0077E-02 | -2.7300E-02 |
| a8 | 7.8718E-03 | 2.1905E-02 | -9.5528E-02 | 1.1339E-01 | 8.4033E-02 |
| a10 | 9.8175E-02 | -5.3283E-02 | -4.5701E-02 | -2.7968E-01 | - |
| a12 | -9.3490E-02 | -1.4082E-02 | 5.3984E-02 | 2.5495E-01 | - |
| Surface # | 132 | 141 | 142 | 151 | 152 |
| N | 1.0608E+00 | 1.6442E+00 | 1.6442E+00 | 2.3602E+00 | 2.5435E+00 |
| K | 0.0000E+00 | -5.0482E+00 | -5.0482E+00 | -3.7552E+01 | -1.2947E+01 |
| a4 | -1.7027E-01 | -5.0812E-01 | -5.0812E-01 | 1.6286E+00 | -2.4222E+00 |
| a5 | 2.2913E-03 | - | - | - | - |
| a6 | 1.7143E-02 | 1.1540E+00 | 1.1540E+00 | -2.4366E+01 | 2.6951E+00 |
| a8 | 1.2100E-01 | 7.0937E+00 | 7.0937E+00 | 1.2466E+02 | -1.8232E+00 |
| a10 | -3.0293E-02 | -2.3399E+01 | -2.3399E+01 | -3.8006E+02 | -1.4576E+00 |
| a12 | - | 2.6152E+01 | 2.6152E+01 | 7.3006E+02 | 2.1270E+00 |
| a14 | - | -1.0593E+01 | -1.0593E+01 | -8.4614E+02 | - |
| a16 | - | - | - | 5.3718E+02 | - |
| a18 | - | - | - | -1.4338E+02 | - |

FIG.5

| f(Focus)=4.20 mm, HFOV ( Half angular field of view)= 34.54 deg. | | | | | | | |
|---|---|---|---|---|---|---|---|
| Surface # | | Radius | Thickness | Refractive index | Abbe number | Material | Focus |
| - | Object | ∞ | 600.00000 | | | | |
| 200 | Aperture stop | ∞ | -0.300 | | | | |
| 211 | 1st lens element | 1.422 | 0.565 | 1.544 | 56.114 | Plastic | 2.401 |
| 212 | | -14.406 | 0.071 | | | | |
| 221 | 2nd lens element | 13.968 | 0.260 | 1.637 | 23.340 | Plastic | -3.763 |
| 222 | | 2.031 | 0.473 | | | | |
| 231 | 3rd lens element | -6.304 | 0.330 | 1.637 | 23.340 | Plastic | 128.528 |
| 232 | | -5.972 | 0.413 | | | | |
| 241 | 4th lens element | -2.070 | 0.625 | 1.536 | 55.699 | Plastic | 2.266 |
| 242 | | -0.847 | 0.306 | | | | |
| 251 | 5th lens element | -3.687 | 0.344 | 1.536 | 55.699 | Plastic | -2.023 |
| 252 | | 1.587 | 0.503 | | | | |
| 261 | IR cut filter | ∞ | 0.300 | | | | |
| 262 | IR cut filter | ∞ | 0.613 | | | | |
| 270 | Image plane | ∞ | -0.005 | | | | |

FIG.8

| Aspherical parameters | | | | | |
|---|---|---|---|---|---|
| Surface # | 211 | 212 | 221 | 222 | 231 |
| N | 1.0000E+00 | 1.0000E+00 | 1.0000E+00 | 1.0000E+00 | 1.0000E+00 |
| K | -4.2957E+00 | 0.0000E+00 | 0.0000E+00 | -7.4227E+00 | 0.0000E+00 |
| a4 | 1.8965E-01 | 6.3234E-02 | 5.8119E-03 | 6.6034E-02 | -2.0509E-01 |
| a6 | -7.9440E-02 | -2.7115E-02 | 1.0886E-01 | 7.0210E-02 | -3.7271E-02 |
| a8 | 7.9910E-03 | 1.6671E-02 | -8.7396E-02 | 1.1803E-01 | 9.7242E-02 |
| a10 | 9.9078E-02 | -6.0372E-02 | -4.4861E-02 | -2.8061E-01 | - |
| a12 | -9.6374E-02 | -1.6673E-02 | 3.5070E-02 | 2.7443E-01 | - |
| Surface # | 232 | 241 | 242 | 251 | 252 |
| N | 1.0497E+00 | 1.6442E+00 | 1.6442E+00 | 2.3602E+00 | 2.5252E+00 |
| K | 0.0000E+00 | -5.0482E+00 | -5.0482E+00 | -3.7552E+01 | -1.2947E+01 |
| a4 | -1.7027E-01 | -5.0812E-01 | -5.0812E-01 | 1.6286E+00 | -2.3625E+00 |
| a5 | -8.9066E-04 | - | - | - | - |
| a6 | 1.4750E-02 | 1.1540E+00 | 1.1540E+00 | -2.4366E+01 | 2.6009E+00 |
| a8 | 1.1979E-01 | 7.0937E+00 | 7.0937E+00 | 1.2466E+02 | -1.7789E+00 |
| a10 | -3.2194E-02 | -2.3399E+01 | -2.3399E+01 | -3.8006E+02 | -1.5432E+00 |
| a12 | - | 2.6152E+01 | 2.6152E+01 | 7.3006E+02 | 2.0811E+00 |
| a14 | - | -1.0593E+01 | -1.0593E+01 | -8.4614E+02 | - |
| a16 | - | - | - | 5.3718E+02 | - |
| a18 | - | - | - | -1.4338E+02 | - |

FIG.9

| f(Focus)=4.13 mm, HFOV ( Half angular field of view)= 32.85 deg. |||||||| 
|---|---|---|---|---|---|---|---|
| Surface # | | Radius | Thickness | Refractive index | Abbe number | Material | Focus |
| - | Object | ∞ | 600.00000 | | | | |
| 300 | Aperture stop | ∞ | -0.289 | | | | |
| 311 | 1st lens element | 1.427 | 0.521 | 1.544 | 56.114 | Plastic | 2.451 |
| 312 | | -18.609 | 0.120 | | | | |
| 321 | 2nd lens element | 13.117 | 0.260 | 1.637 | 23.340 | Plastic | -3.579 |
| 322 | | 1.928 | 0.338 | | | | |
| 331 | 3rd lens element | -21.408 | 0.330 | 1.637 | 23.340 | Plastic | 27.310 |
| 332 | | -9.656 | 0.456 | | | | |
| 341 | 4th lens element | -2.070 | 0.652 | 1.536 | 55.699 | Plastic | 2.257 |
| 342 | | -0.848 | 0.286 | | | | |
| 351 | 5th lens element | -3.687 | 0.356 | 1.536 | 55.699 | Plastic | -2.048 |
| 352 | | 1.617 | 0.503 | | | | |
| 361 | IR cut filter | ∞ | 0.300 | | | | |
| 362 | IR cut filter | ∞ | 0.631 | | | | |
| 370 | Image plane | ∞ | -0.013 | | | | |

FIG.12

| Aspherical parameters | | | | | |
|---|---|---|---|---|---|
| Surface # | 311 | 312 | 321 | 322 | 331 |
| N | 1.0000E+00 | 1.0000E+00 | 1.0000E+00 | 1.0000E+00 | 1.0000E+00 |
| K | -4.3593E+00 | 0.0000E+00 | 0.0000E+00 | -7.2096E+00 | 0.0000E+00 |
| a4 | 1.8955E-01 | 5.8914E-02 | 6.4961E-03 | 6.4499E-02 | -2.0971E-01 |
| a6 | -7.8795E-02 | -2.7993E-02 | 1.0622E-01 | 6.5351E-02 | -3.3476E-02 |
| a8 | 9.9011E-03 | 2.2387E-02 | -9.1362E-02 | 1.1591E-01 | 9.9521E-02 |
| a10 | 9.9384E-02 | -5.0781E-02 | -4.3481E-02 | -2.8331E-01 | - |
| a12 | -9.7059E-02 | -1.4766E-02 | 4.6617E-02 | 2.6857E-01 | - |
| Surface # | 332 | 341 | 342 | 351 | 352 |
| N | 1.0486E+00 | 1.6442E+00 | 1.7358E+00 | 2.3602E+00 | 2.5125E+00 |
| K | 0.0000E+00 | -5.0482E+00 | -1.0011E+00 | -3.7552E+01 | -1.2947E+01 |
| a4 | -1.7027E-01 | -5.0812E-01 | 3.0167E+00 | 1.6286E+00 | -2.4686E+00 |
| a5 | 4.1121E-03 | - | - | - | - |
| a6 | 2.0267E-02 | 1.1540E+00 | -1.0281E+01 | -2.4366E+01 | 2.6347E+00 |
| a8 | 1.2184E-01 | 7.0937E+00 | 3.3648E+01 | 1.2466E+02 | -1.7324E+00 |
| a10 | -3.1709E-02 | -2.3399E+01 | -5.8775E+01 | -3.8006E+02 | -1.5148E+00 |
| a12 | - | 2.6152E+01 | 5.4194E+01 | 7.3006E+02 | 2.0902E+00 |
| a14 | - | -1.0593E+01 | -2.4887E+01 | -8.4614E+02 | - |
| a16 | - | - | 4.2450E+00 | 5.3718E+02 | - |
| a18 | - | - | - | -1.4338E+02 | - |

FIG.13

| \multicolumn{8}{c}{f(Focus)=4.23 mm, HFOV ( Half angular field of view)= 34.10 deg.} |||||||| 
|---|---|---|---|---|---|---|---|
| Surface # | | Radius | Thickness | Refractive index | Abbe number | Material | Focus |
| - | Object | ∞ | 600.00000 | | | | |
| 400 | Aperture stop | ∞ | -0.301 | | | | |
| 411 | 1st lens element | 1.454 | 0.455 | 1.544 | 56.114 | Plastic | 2.433 |
| 412 | | -13.657 | 0.100 | | | | |
| 421 | 2nd lens element | 22.346 | 0.260 | 1.637 | 23.340 | Plastic | -3.828 |
| 422 | | 2.189 | 0.540 | | | | |
| 431 | 3rd lens element | -7.194 | 0.330 | 1.637 | 23.340 | Plastic | 81.762 |
| 432 | | -6.434 | 0.378 | | | | |
| 441 | 4th lens element | -2.070 | 0.655 | 1.536 | 55.699 | Plastic | 2.252 |
| 442 | | -0.847 | 0.340 | | | | |
| 451 | 5th lens element | -3.687 | 0.300 | 1.536 | 55.699 | Plastic | -2.035 |
| 452 | | 1.594 | 0.503 | | | | |
| 461 | IR cut filter | ∞ | 0.300 | | | | |
| 462 | IR cut filter | ∞ | 0.694 | | | | |
| 470 | Image plane | ∞ | 0.012 | | | | |

FIG.16

| Aspherical parameters | | | | | |
|---|---|---|---|---|---|
| Surface # | 411 | 412 | 421 | 422 | 431 |
| N | 1.0000E+00 | 1.0000E+00 | 1.0000E+00 | 1.0000E+00 | 1.0000E+00 |
| K | -4.5213E+00 | 0.0000E+00 | 0.0000E+00 | -7.2532E+00 | 0.0000E+00 |
| a4 | 1.8842E-01 | 5.5911E-02 | 5.4598E-03 | 6.2099E-02 | -1.9305E-01 |
| a6 | -7.8300E-02 | -2.5452E-02 | 1.0317E-01 | 6.0844E-02 | -2.1529E-02 |
| a8 | 1.1316E-02 | 3.1795E-02 | -9.2961E-02 | 1.1609E-01 | 1.0492E-01 |
| a10 | 1.0225E-01 | -4.0371E-02 | -3.7769E-02 | -2.7967E-01 | - |
| a12 | -9.5352E-02 | -1.1591E-02 | 6.7104E-02 | 2.6196E-01 | - |
| Surface # | 432 | 441 | 442 | 451 | 452 |
| N | 1.0469E+00 | 1.6442E+00 | 1.7401E+00 | 2.3602E+00 | 2.5390E+00 |
| K | 0.0000E+00 | -5.0482E+00 | -1.0047E+00 | -3.7552E+01 | -1.2947E+01 |
| a4 | -1.7027E-01 | -5.0812E-01 | 3.0235E+00 | 1.6286E+00 | -2.4447E+00 |
| a5 | -1.8415E-03 | - | - | - | - |
| a6 | 1.5639E-02 | 1.1540E+00 | -1.0266E+01 | -2.4366E+01 | 2.6807E+00 |
| a8 | 1.2011E-01 | 7.0937E+00 | 3.3652E+01 | 1.2466E+02 | -1.7671E+00 |
| a10 | -3.1153E-02 | -2.3399E+01 | -5.8772E+01 | -3.8006E+02 | -1.4974E+00 |
| a12 | - | 2.6152E+01 | 5.4194E+01 | 7.3006E+02 | 2.0910E+00 |
| a14 | - | -1.0593E+01 | -2.4892E+01 | -8.4614E+02 | - |
| a16 | - | - | 4.2317E+00 | 5.3718E+02 | - |
| a18 | - | - | - | -1.4338E+02 | - |

FIG.17

| f(Focus)=3.53 mm, HFOV ( Half angular field of view)= 39.53 deg. | | | | | | | |
|---|---|---|---|---|---|---|---|
| Surface # | | Radius | Thickness | Refractive index | Abbe number | Material | Focus |
| - | Object | ∞ | 600.00000 | | | | |
| 500 | Aperture stop | ∞ | -0.205 | | | | |
| 511 | 1st lens element | 1.455 | 0.326 | 1.544 | 56.114 | Plastic | 3.365 |
| 512 | | 6.435 | 0.107 | | | | |
| 521 | 2nd lens element | 3.234 | 0.260 | 1.637 | 23.340 | Plastic | -9.685 |
| 522 | | 2.056 | 0.360 | | | | |
| 531 | 3rd lens element | 13.716 | 0.330 | 1.637 | 23.340 | Plastic | 22.406 |
| 532 | | 346.815 | 0.292 | | | | |
| 541 | 4th lens element | -2.070 | 0.792 | 1.536 | 55.699 | Plastic | 2.179 |
| 542 | | -0.847 | 0.320 | | | | |
| 551 | 5th lens element | -3.687 | 0.414 | 1.536 | 55.699 | Plastic | -2.001 |
| 552 | | 1.573 | 0.503 | | | | |
| 561 | IR cut filter | ∞ | 0.300 | | | | |
| 562 | IR cut filter | ∞ | 0.421 | | | | |
| 570 | Image plane | ∞ | 0.035 | | | | |

FIG.20

| Aspherical parameters | | | | | |
|---|---|---|---|---|---|
| Surface # | 511 | 512 | 521 | 522 | 531 |
| N | 1.0000E+00 | 1.0000E+00 | 1.0000E+00 | 1.0000E+00 | 1.0000E+00 |
| K | -4.3661E+00 | 0.0000E+00 | 0.0000E+00 | -6.4571E+00 | 0.0000E+00 |
| a4 | 1.9114E-01 | 6.0080E-02 | 7.3950E-03 | 7.1276E-02 | -2.0483E-01 |
| a6 | -7.3144E-02 | -3.0772E-02 | 1.1245E-01 | 7.2496E-02 | -2.0059E-02 |
| a8 | 1.5510E-02 | 1.7226E-02 | -8.4095E-02 | 1.1773E-01 | 1.0336E-01 |
| a10 | 1.0052E-01 | -5.2083E-02 | -4.0989E-02 | -2.9016E-01 | - |
| a12 | -1.0830E-01 | -2.5633E-03 | 2.5619E-02 | 2.4607E-01 | - |
| Surface # | 532 | 541 | 542 | 551 | 552 |
| N | 1.0331E+00 | 1.6442E+00 | 1.7476E+00 | 2.3602E+00 | 2.7408E+00 |
| K | 0.0000E+00 | -5.0482E+00 | -9.7649E-01 | -3.7552E+01 | -1.2947E+01 |
| a4 | -1.7027E-01 | -5.0812E-01 | 2.9701E+00 | 1.6286E+00 | -2.3959E+00 |
| a5 | -4.4893E-03 | - | - | - | - |
| a6 | 1.4257E-02 | 1.1540E+00 | -1.0291E+01 | -2.4366E+01 | 2.5728E+00 |
| a8 | 1.2274E-01 | 7.0937E+00 | 3.3669E+01 | 1.2466E+02 | -1.8453E+00 |
| a10 | -2.4686E-02 | -2.3399E+01 | -5.8747E+01 | -3.8006E+02 | -1.5044E+00 |
| a12 | - | 2.6152E+01 | 5.4215E+01 | 7.3006E+02 | 2.0907E+00 |
| a14 | - | -1.0593E+01 | -2.4877E+01 | -8.4614E+02 | - |
| a16 | - | - | 4.2330E+00 | 5.3718E+02 | - |
| a18 | - | - | - | -1.4338E+02 | - |

FIG.21

| f(Focus)=4.10 mm, HFOV ( Half angular field of view)= 35.65 deg. | | | | | | | |
|---|---|---|---|---|---|---|---|
| Surface # | | Radius | Thickness | Refractive index | Abbe number | Material | Focus |
| - | Object | ∞ | 600.00000 | | | | |
| 600 | Aperture stop | ∞ | -0.290 | | | | |
| 611 | 1st lens element | 1.405 | 0.433 | 1.544 | 56.114 | Plastic | 2.412 |
| 612 | | -18.695 | 0.101 | | | | |
| 621 | 2nd lens element | 14.702 | 0.260 | 1.637 | 23.340 | Plastic | -3.593 |
| 622 | | 1.967 | 0.366 | | | | |
| 631 | 3rd lens element | -9.179 | 0.330 | 1.637 | 23.340 | Plastic | 36.718 |
| 632 | | -6.685 | 0.463 | | | | |
| 641 | 4th lens element | -2.070 | 0.591 | 1.536 | 55.699 | Plastic | 2.124 |
| 642 | | -0.808 | 0.340 | | | | |
| 651 | 5th lens element | -3.687 | 0.203 | 1.536 | 55.699 | Plastic | -1.942 |
| 652 | | 1.480 | 0.503 | | | | |
| 661 | IR cut filter | ∞ | 0.300 | | | | |
| 662 | IR cut filter | ∞ | 0.778 | | | | |
| 670 | Image plane | ∞ | -0.023 | | | | |

FIG.24

| Aspherical parameters | | | | | |
|---|---|---|---|---|---|
| Surface # | 611 | 612 | 621 | 622 | 631 |
| N | 1.0000E+00 | 1.0000E+00 | 1.0000E+00 | 1.0000E+00 | 1.0000E+00 |
| K | -4.1955E+00 | 0.0000E+00 | 0.0000E+00 | -6.7424E+00 | 0.0000E+00 |
| a4 | 1.9236E-01 | 5.7137E-02 | 6.6085E-03 | 6.8890E-02 | -1.9748E-01 |
| a6 | -7.5244E-02 | -2.9521E-02 | 1.0823E-01 | 7.1565E-02 | -3.9522E-03 |
| a8 | 1.2348E-02 | 2.6616E-02 | -8.9656E-02 | 1.2445E-01 | 1.0810E-01 |
| a10 | 9.8383E-02 | -4.0433E-02 | -3.6749E-02 | -2.6010E-01 | - |
| a12 | -1.0861E-01 | -1.3581E-02 | 7.6479E-02 | 2.6821E-01 | - |
| Surface # | 632 | 641 | 642 | 651 | 652 |
| N | 1.0624E+00 | 1.6442E+00 | 1.7080E+00 | 2.3602E+00 | 2.4177E+00 |
| K | 0.0000E+00 | -5.0482E+00 | -1.0162E+00 | -3.7552E+01 | -1.2947E+01 |
| a4 | -1.7027E-01 | -5.0812E-01 | 3.0522E+00 | 1.6286E+00 | -2.4268E+00 |
| a5 | 1.4321E-02 | - | - | - | - |
| a6 | 2.5673E-02 | 1.1540E+00 | -1.0272E+01 | -2.4366E+01 | 2.7561E+00 |
| a8 | 1.2291E-01 | 7.0937E+00 | 3.3634E+01 | 1.2466E+02 | -1.7475E+00 |
| a10 | -2.7903E-02 | -2.3399E+01 | -5.8792E+01 | -3.8006E+02 | -1.5215E+00 |
| a12 | - | 2.6152E+01 | 5.4181E+01 | 7.3006E+02 | 2.0217E+00 |
| a14 | - | -1.0593E+01 | -2.4894E+01 | -8.4614E+02 | - |
| a16 | - | - | 4.2475E+00 | 5.3718E+02 | - |
| a18 | - | - | - | -1.4338E+02 | - |

FIG.25

| Embodiment | 1st Embodiment | 2nd Embodiment | 3rd Embodiment | 4th Embodiment | 5th Embodiment | 6th Embodiment |
|---|---|---|---|---|---|---|
| G12 | 0.10 | 0.07 | 0.12 | 0.10 | 0.11 | 0.10 |
| T2 | 0.26 | 0.26 | 0.26 | 0.26 | 0.26 | 0.26 |
| G23 | 0.39 | 0.47 | 0.34 | 0.54 | 0.36 | 0.37 |
| G45 | 0.28 | 0.31 | 0.29 | 0.34 | 0.32 | 0.34 |
| T5 | 0.37 | 0.34 | 0.36 | 0.30 | 0.41 | 0.20 |
| Gaa | 1.19 | 1.26 | 1.20 | 1.36 | 1.08 | 1.27 |
| ALT | 2.17 | 2.12 | 2.12 | 2.00 | 2.12 | 1.82 |
| G23-G34 | 0.11 | 0.17 | 0.05 | 0.20 | 0.04 | 0.03 |
| Gaa/T5 | 3.22 | 3.67 | 3.37 | 4.53 | 2.61 | 6.27 |
| G23/G12 | 3.86 | 6.70 | 2.80 | 5.40 | 3.37 | 3.62 |
| ALT/T2 | 8.34 | 8.17 | 8.15 | 7.69 | 8.16 | 6.99 |
| Fno | 2.4 | 2.4 | 2.4 | 2.4 | 2.4 | 2.4 |

FIG.26

MOBILE DEVICE AND OPTICAL IMAGING LENS THEREOF

INCORPORATION BY REFERENCE

This application claims priority from Taiwan Patent Application No. 101137762, filed on Oct. 12, 2012, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having five lens elements and an optical imaging lens thereof.

BACKGROUND

The ever-increasing demand for smaller sized mobile devices, such as cell phones, digital cameras, etc. has correspondingly triggered a growing need for a smaller sized photography module (comprising elements such as an optical imaging lens, a module housing unit, and an image sensor, etc.) contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

U.S. Patent Publication No. 2011176049, U.S. Patent Publication No. 20110316969, and U.S. Pat. No. 7,480,105 all disclosed an optical imaging lens constructed with an optical imaging lens having five lens elements. The negative refracting power of the first image lens is not benefit to shorten the length of the optical imaging lens and sustain good optical characteristics.

U.S. Patent Publication No. 20120105704, U.S. Patent Publication No. 20110013069, R.O.C. Patent Publication No. 2012027044, and R.O.C. Patent No. M369459 all disclosed an optical imaging lens constructed with an optical imaging lens having five lens elements. The thickness of the fifth lens elements is thicker and unfavorable for shortening the length of the imaging lens.

U.S. Patent Publication No. 20100254029, U.S. Patent Publication No. 20120069455, U.S. Patent Publication No. 20120087019, U.S. Patent Publication No. 20120087020, and R.O.C. Patent Publication No. 2012013926 all disclosed an optical imaging lens constructed with an optical imaging lens having five lens elements. The sum of all air gaps between the lens elements is excessive. Meanwhile, the length of the optical imaging lens disclosed in U.S. Patent Publication No. 20100254029 is greater than 8.5 mm, and this is unfavorable for endeavoring slimer mobile devices, such as cell phones and digital cameras.

How to effectively shorten the length of the optical imaging lens and how to provide good imaging quality are the most important topics in the industry to pursue the trend of smaller and smaller mobile devices. Therefore, there is needed to develop optical imaging lens with a shorter length, while also having good optical characters.

SUMMARY

An object of the present invention is to provide a mobile device and an optical imaging lens thereof. With controlling the convex or concave shape and/or the refracting power of the surfaces of the lens elements, the length of the optical imaging lens is shortened and meanwhile the good optical characters, such as high resolution, and system functionality are sustained.

In an exemplary embodiment, an optical imaging lens comprises, sequentially from an object side to an image side, first, second, third, fourth and fifth lens elements, each of said first, second, third, fourth and fifth lens elements having an object-side surface facing toward the object side and an image-side surface facing toward the image side, wherein: the first lens element has positive refracting power, and the object-side surface thereof is a convex surface; the second lens element has negative refracting power; the third lens element has positive refracting power; the image-side surface of the fourth lens element is a convex surface; the object-side surface of the fifth lens element comprises a concave portion in a vicinity of the optical axis, and the image-side surface of the fifth lens element comprises a concave portion in a vicinity of the optical axis and a convex portion in a vicinity of a periphery of the fifth lens element; and lens as a whole having only the five lens elements having refracting power.

In another exemplary embodiment, other related parameters, such as a central thickness of a lens element along the optical axis and or the ratio among a central thickness of a lens element along the optical axis and the sum of all air gaps can be controlled to achieve good optical characteristics. For example, an air gap between the second lens element and the third lens element along the optical axis, $G_{23}$, and an air gap between the fourth lens element and the fifth lens element along the optical axis, $G_{45}$, could be controlled to satisfy the equation as follows:

$$0 \le G_{23} - G_{45} \text{ (mm)};$$

$$0.1 \le G_{23} - G_{45} \text{ (mm); or}$$

$$0 \le G_{23} - G_{45} \le 0.2 \text{ (mm)}.$$

For example, the sum of all four air gaps from the first lens element to the fifth lens element along the optical axis, $G_{aa}$, and a central thickness of the fifth lens element along the optical axis, $T_5$, could be controlled to satisfy the equation as follows:

$$2.3 \le \frac{G_{aa}}{T_5};$$

or $$2.6 \le \frac{G_{aa}}{T_5}.$$

For example, $G_{23}$ and an air gap between the first lens element and the second lens element along the optical axis, $G_{12}$, could be controlled to satisfy the equation as follows:

$$2 \le \frac{G_{23}}{G_{12}};$$

or $$2 \le \frac{G_{23}}{G_{12}} \le 7.5.$$

For example, the total thickness of all five lens elements, ALT, and a central thickness of the second lens element along the optical axis, $T_2$, could be controlled to satisfy the equation as follows:

$$6.5 \le \frac{ALT}{T_2};$$

or $$6.5 \le \frac{ALT}{T_2} \le 10.$$

Aforesaid exemplary embodiments are not limited and could be selectively incorporated in other embodiments described herein.

In some exemplary embodiments, an aperture stop could be further comprised for adjusting the light intensity entering into the system. The aperture stop is exemplarily but not limited to be positioned before the first imaging lens.

In some exemplary embodiments, more details about the convex or concave surface structure could be incorporated for one specific lens element or broadly for plural lens elements to enhance the control for the system performance and/or resolution. For example, the object-side surface of the third lens element could comprise a concave portion in a vicinity of the optical axis.

In another exemplary embodiment, a mobile device comprises a housing and a photography module positioned in the housing. The photography module comprises any of aforesaid example embodiments of optical imaging lens, a lens barrel, a module housing unit, and an image sensor. The lens barrel is for positioning the optical imaging lens, the module housing unit is for positioning the lens barrel, and the image sensor is positioned at the image-side of the optical imaging lens.

In some exemplary embodiments, the module housing unit optionally comprises a lens backseat comprising a first seat element and a second seat element, the first seat element is positioned close to the outside of the lens barrel and along with an axis for driving the lens barrel and the optical imaging lens positioned therein to move along the axis, and the second seat element is positioned along the axis and around the outside of the first seat element.

In some exemplary embodiments, the module housing unit optionally further comprises an image sensor base positioned between the second seat element and the image sensor, and the image sensor base contacts with the second seat element.

Through controlling the convex or concave shape of the surfaces and/or the refraction power of the lens element(s), the mobile device and the optical imaging lens thereof in exemplary embodiments achieve good optical characters and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 is a cross-sectional view of a first embodiment of an optical imaging lens having five lens elements according to the present disclosures;

FIG. 2 is a chart of longitudinal spherical aberration and other kinds of optical aberrations of a first embodiment of the optical imaging lens according to the present disclosures;

FIG. 4 is a table of optical data for each lens element of a first embodiment of an optical imaging lens according to the present disclosures;

FIG. 5 is a table of aspherical data of a first embodiment of the optical imaging lens according to the present disclosures;

FIG. 8 is a table of optical data for each lens element of the optical imaging lens of a second embodiment of the present disclosures;

FIG. 9 is a table of aspherical data of a second embodiment of the optical imaging lens according to the present disclosures;

FIG. 12 is a table of optical data for each lens element of the optical imaging lens of a third embodiment of the present disclosures;

FIG. 13 is a table of aspherical data of a third embodiment of the optical imaging lens according to the present disclosures;

FIG. 16 is a table of optical data for each lens element of the optical imaging lens of a fourth embodiment of the present disclosures;

FIG. 17 is a table of aspherical data of a fourth embodiment of the optical imaging lens according to the present disclosures;

FIG. 20 is a table of optical data for each lens element of the optical imaging lens of a fifth embodiment of the present disclosures;

FIG. 21 is a table of aspherical data of a fifth embodiment of the optical imaging lens according to the present disclosures;

FIG. 24 is a table of optical data for each lens element of the optical imaging lens of a sixth embodiment of the present disclosures;

FIG. 25 is a table of aspherical data of a sixth embodiment of the optical imaging lens according to the present disclosures;

FIG. 26 is a table for the values of $G_{23}$–$G_{45}$, $G_{aa}/T_5$, $G_{23}/G_{12}$ and $ALT/T_2$ of all six example embodiments;

DETAILED DESCRIPTION

Figure 3:
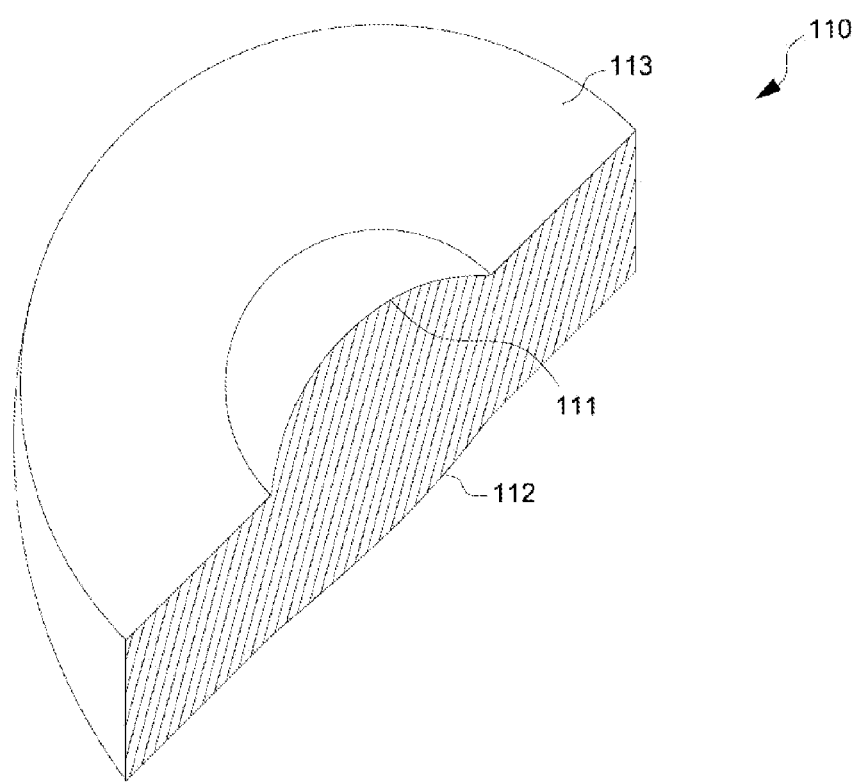
FIG. 3 is a cross-sectional view of a lens element of the optical imaging lens of an example embodiment of the present disclosures.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Example embodiments of an optical imaging lens may comprise a first lens element, a second lens element, a third lens element, a fourth lens element, and a fifth lens element arranged sequentially from an object side to an image side, each of the lens elements has an object-side surface facing toward the object side and an image-side surface facing toward the image side. Example embodiments of the lens as a whole may only comprise the five lens elements having refracting power. In an example embodiment: the first lens element has positive refracting power, and the object-side surface thereof is a convex surface; the second lens element has negative refracting power; the third lens element has positive refracting power; the image-side surface of the fourth lens element is a convex surface; the object-side surface of the fifth lens element comprises a concave portion in a vicinity of the optical axis, and the image-side surface of the fifth lens element comprises a concave portion in a vicinity of the optical axis and a convex portion in a vicinity of a periphery of the fifth lens element; and lens as a whole having only the five lens elements having refracting power.

Preferably, the lens elements are designed in light of the optical characteristics and the length of the optical imaging lens. For example, the first lens element having positive refracting power and the convex object-side surface has better light converge ability. With an aperture stop positioned before the first lens element to work with the positive refracting power of the first lens element, the length of the optical imaging lens could be effectively shortened. The second lens element having negative refracting power could eliminate the aberration of the optical lens. The third lens element having positive refracting power is able to share the burden of the positive refracting power required in the optical imaging lens with the first lens element, therefore the sensitivity of the optical lens and inaccuracy in the manufacturing process is effectively reduced. With a further concave portion in a vicinity of the optical axis on the object-side surface of the third lens element, the aberration of the optical lens could be eliminated. The fourth lens element having the image-side convex surface could help for light converging. The fifth lens element having the concave portion in a vicinity of the optical axis on the object-side surface thereof and the concave portion in a vicinity of the optical axis and the convex portion in a vicinity of a periphery of the fifth lens element on the image-side surface thereof could assist in adjusting the curvature, reducing the high level aberration, and depressing the angle of the chief ray (the incident angle of the light onto the image sensor), and then the sensitivity of the whole system is promoted.

In another exemplary embodiment, other related parameters, such as a central thickness of a lens element along the optical axis and/or the ratio among a central thickness of a lens element along the optical axis and the sum of all air gaps. For example, an air gap between the second lens element and the third lens element along the optical axis, $G_{23}$, and an air gap between the fourth lens element and the fifth lens element along the optical axis, $G_{45}$, could be controlled to satisfy the equation as follows:

$$0 \leq G_{23} - G_{45} \text{ (mm)} \qquad \text{Equation (1);}$$

$$0.1 \leq G_{23} - G_{45} \text{ (mm)} \qquad \text{Equation (1'); or}$$

$$0 \leq G_{23} - G_{45} \leq 0.2 \text{ (mm)} \qquad \text{Equation (1'').}$$

For example, the sum of all four air gaps from the first lens element to the fifth lens element along the optical axis, $G_{aa}$, and a central thickness of the fifth lens element along the optical axis, $T_5$, could be controlled to satisfy the equation as follows:

$$2.3 \leq \frac{G_{aa}}{T_5}; \qquad \text{Equation (2)}$$

or $$2.6 \leq \frac{G_{aa}}{T_5}. \qquad \text{Equation (2')}$$

For example, $G_{23}$ and an air gap between the first lens element and the second lens element along the optical axis, $G_{12}$, could be controlled to satisfy the equation as follows:

$$2 \leq \frac{G_{23}}{G_{12}}; \qquad \text{Equation (3)}$$

or $$2 \leq \frac{G_{23}}{G_{12}} \leq 7.5. \qquad \text{Equation (3')}$$

For example, the total thickness of all five lens elements, ALT, and a central thickness of the second lens element along the optical axis, $T_2$, could be controlled to satisfy the equation as follows:

$$6.5 \leq \frac{ALT}{T_2}; \qquad \text{Equation (4)}$$

or $$6.5 \leq \frac{ALT}{T_2} \leq 10. \qquad \text{Equation (4')}$$

Aforesaid exemplary embodiments are not limited and could be selectively incorporated in other embodiments described herein.

Reference is now made to equation (1). Equation (1) could effectively avoid from a great air gap $G_{45}$ and $G_{45}$ can be smaller because there is no edge resistance between the fourth and fifth lens elements due to the image-side convex surface of the fourth lens element. When $G_{23}$–$G_{45}$ is restricted in a range from 0 to 0.1, the length of the optical imaging lens could be shortened and the good optical characters could be sustained, but the edge resistance between the image-side of the second lens element and the object-side of the third lens element may be induced due to the smaller $G_{23}$, therefore, preferably, equation (1') is satisfied. Further, equation (1) could be limited by an upper limit to satisfy equation (1").

Reference is now made to equation (2). As aforesaid illustration, since the fifth lens element is formed with concave position in a vicinity of the optical axis in both object-side and image-side surface, $T_5$ is possible to be thinner to shortened the length of the optical lens. Therefore, if equation (2) is not satisfied, it means the shortened ratio of $T_5$ is lower than $G_{aa}$, and this is not benefit to shorten the length of the optical lens. Preferably, equation (2) may be further restricted by an upper limit to satisfy equation (2').

Reference is now made to equation (3). Equation (3) is benefit to the configuration for the position of the first, second and third lens elements. If equation (3) is not satisfied, it means that $G_{12}$ is bigger, and this makes the light emitting from the first lens element could not reach a proper height when it enters into the second lens element. Preferably, equation (3') may be further satisfied.

Reference is now made to equation (4). Equation (4) is benefit to the configuration for the thickness of the second lens element and the rest lens element. If equation (4) is not satisfied, it means that $T_2$ is relatively bigger. This is not a proper design since an effective diameter of the second lens element is smaller among all, the thickness of the second lens element is possible to be thinner. Preferably, equation (4) may be further restricted by an upper limit to satisfy equation (4').

When implementing example embodiments, more details about the convex or concave surface structure and/or the refracting power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Several exemplary embodiments and associated optical data will now be provided for illustrating example embodiments of optical imaging lens with good optical characters and a shortened length. Reference is now made to FIGS. 1-5. FIG. 1 illustrates an example cross-sectional view of an optical imaging lens 1 having five lens elements of the optical imaging lens according to a first example embodiment. FIG. 2 shows example charts of longitudinal spherical aberration and other kinds of optical aberrations of the optical imaging lens 1 according to an example embodiment. FIG. 3 depicts another example cross-sectional view of a lens element of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 1, the optical imaging lens 1 of the present embodiment comprises, in order from an object side A1 to an image side A2, an aperture stop 100, a first lens element 110, a second lens element 120, a third lens element 130, a fourth lens element 140, a fifth lens element 150. A filtering unit 160 and an image plane 170 of an image sensor are positioned at the image side A2 of the optical lens 1. Each of the first, second, third, fourth, fifth lens elements 110, 120, 130, 140, 150 and the filtering unit 160 has an object-side surface 111/121/131/141/151/161 facing toward the object side A1 and an image-side surface 112/122/132/142/152/162 facing toward the image side A2. The example embodiment of the filtering unit 160 illustrated is an IR cut filter (infrared cut filter) positioned between the fifth lens element 150 and an image plane 170. The filtering unit 160 filters light with specific wavelength from the light passing optical imaging lens 1. For example, IR light is filtered, and this will prohibit the IR light which is not seen by human eyes from producing an image on the image plane 170.

Exemplary embodiments of each lens elements of the optical imaging lens 1 will now be described with reference to the drawings.

An example embodiment of the first lens element 110 may have positive refracting power, which may be constructed by plastic material. The object-side surface 111 and the image-side surface 112 are both convex surfaces.

The second lens element 120 may have negative refracting power, which may be constructed by plastic material. The object-side surface 121 is a convex surface and the image-side surface 122 is a concave surface.

The third lens element 130 may have positive refracting power, which may be constructed by plastic material. The object-side surface 131 is a concave surface having a concave portion 1311 in a vicinity of the optical axis. The image-side surface 132 is a convex surface.

The fourth lens element 140 may have positive refracting power, which may be constructed by plastic material. The object-side surface 141 is a concave surface, and the image-side surface 142 is a convex surface.

The fifth lens element 150 may have negative refracting power, which may be constructed by plastic material. The object-side surface 141 is a concave surface comprising a concave portion 1511 in a vicinity of the optical axis. The image-side surface 152 has a concave portion 1521 in a vicinity of the optical axis and a convex portion 1522 in a vicinity of a periphery of the fifth lens element 150.

In example embodiments, air gaps exist between the lens elements 110, 120, 130, 140, 150, the filtering unit 160, and the image plane 170 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the filtering unit 160, and the air gap d6 existing between the filtering unit 160 and the image plane 170 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by $G_{12}$, the air gap d3 is denoted by $G_{34}$, and the sum of all air gaps d1, d2, d3, d4 between the first and fifth lens elements 110, 150 is denoted by $G_{aa}$.

FIG. 4 depicts the optical characters of each lens elements in the optical imaging lens 1 of the present embodiment, wherein the values of $G_{23}$–$G_{45}$, $G_{aa}/T_5$, $G_{23}/G_{12}$ and $ALT/T_2$ are:

$(G_{23}-G_{45})$=0.11 (mm), satisfying equation (1), (1'), (1");

$(G_{aa}/T_5)$=3.22, satisfying equation (2), (2');

$(G_{23}/G_{12})$=3.86, satisfying equation (3), (3');

$(ALT/T_2)$=8.34, satisfying equation (4), (4');

wherein the distance from the object-side convex surface 111 of the first lens element 110 to the image plane 170 along the optical axis is 4.56 (mm), and the length of the optical imaging lens 1 is shortened.

Please note that, in example embodiments, to clearly illustrate the structure of each lens element, only the part where light passes, is shown. For example, taking the first lens element 110 as an example, FIG. 1 illustrates the object-side convex surface 111 and the image-side convex surface 112. However, when implementing each lens element of the present embodiment, a fixing part for positioning the lens elements inside the optical imaging lens 1 may be formed selectively. Based on the first lens element 110, please refer to FIG. 3, which illustrates the first lens element 110 further comprising a fixing part. Here the fixing part is not limited to a protruding part 113 extending from the object-side convex surface 111 and the image-side convex surface 112 for mounting the first lens element 110 in the optical imaging lens 1, and ideally, light will not pass through the protruding part 113.

The aspherical surfaces, including the convex surface 111 and the convex surface 112 of the first lens element 110, the convex surface 121 and the concave surface 122 of the second lens element 120, the concave surface 131 and the convex surface 132 of the third lens element 130, the concave surface 141 and the image-side surface 142 of the fourth lens element 140, and the concave surface 151 and the image-side surface 152 of the fifth lens element 150 are all defined by the following aspherical formula:

$$Z(Y) = \frac{Y^2}{R} \bigg/ \left(1 + \sqrt{1-(1+K)\frac{Y^2}{R^2}}\right) + \sum_{i=1}^{n} a_i \times \left(\frac{Y}{N}\right)^i$$

wherein,

R represents the radius of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_i$ represents a aspherical coefficient of $i^{th}$ level;

and N represents the normalization radius.

The values of each aspherical parameter are shown in FIG. 5.

As illustrated in FIG. 2, the optical imaging lens 1 of the present example embodiment shows great characteristics in the longitudinal spherical aberration (a), astigmatism aberration in the sagittal direction (b), astigmatism aberration in the tangential direction (c), and distortion aberration (d). Therefore, according to above illustration, the optical imaging lens 1 of the example embodiment indeed achieves great optical performance and the length of the optical imaging lens 1 is effectively shortened.

Figure 6:
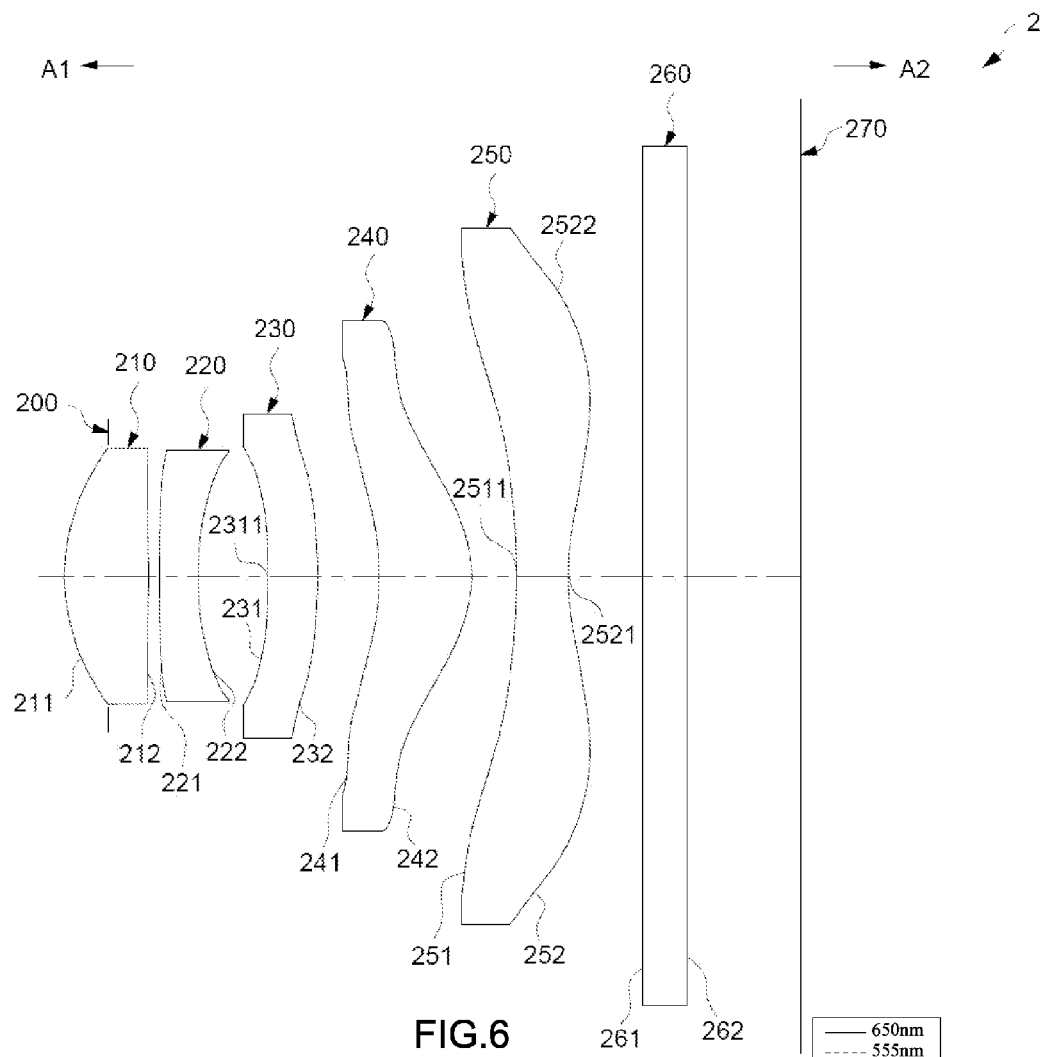
FIG. 6 is a cross-sectional view of a second embodiment of an optical imaging lens having five lens elements according to the present disclosures.
Figure 7:
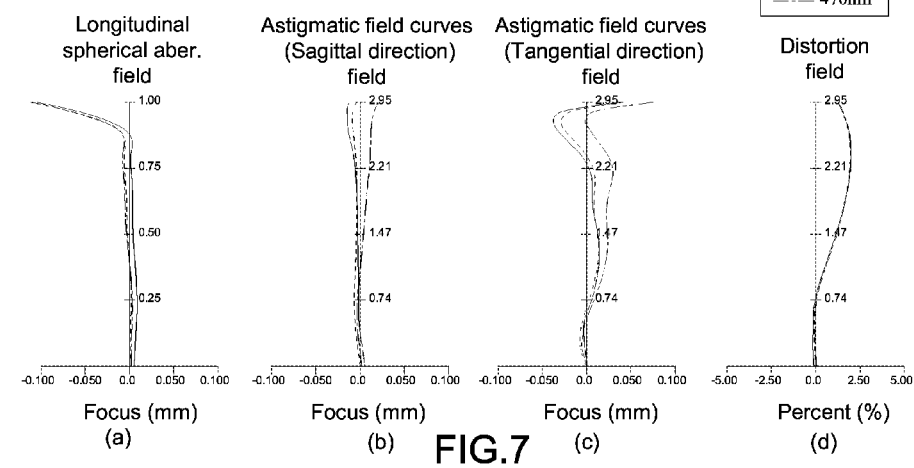
FIG. 7 is a chart of longitudinal spherical aberration and other kinds of optical aberrations of a second embodiment of the optical imaging lens according to the present disclosures.

Reference is now made to FIGS. 6-9. FIG. 6 illustrates an example cross-sectional view of an optical imaging lens 2 having five lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 211 for labeling the convex object-side surface of the first lens element, reference number 212 for labeling the convex image-side surface of the first lens element, etc.

As shown in FIG. 6, the optical imaging lens 2 of the present embodiment, in an order from an object side A1 to an image side A2, comprises an aperture stop 200, a first lens element 210, a second lens element 220, a third lens element 230, a fourth lens element 240, and a fifth lens element 250. A filtering unit 260 and an image plane 270 of an image sensor are positioned at the image side A2 of the optical lens 2. Each of the first, second, third, fourth, fifth lens elements 210, 220, 230, 240, 250 and the filtering unit 260 has an object-side surface 211/221/231/241/251/261 facing toward the object side A1 and an image-side surface 212/222/232/242/252/262 facing toward the image side A2. The example embodiment of the filtering unit 260 illustrated is an IR cut filter (infrared cut filter) positioned between the fifth lens element 250 and an image plane 270. The filtering unit 260 filters light with specific wavelength from the light passing optical imaging lens 2. For example, IR light is filtered, and this will prohibit the IR light which is not seen by human eyes from producing an image on the image plane 270.

The differences between the second embodiment and the first embodiment are the thickness of each lens element and the distance of each air gap. Please refer to FIG. 8 for the optical characteristics of each lens elements in the optical imaging lens 2 of the present embodiment, wherein the values of $G_{23}$–$G_{45}$, $G_{aa}/T_5$, $G_{23}/G_{12}$ and $ALT/T_2$ are:

$(G_{23}-G_{45})$=0.17 (mm), satisfying equation (1), (1'), (1");

$(G_{aa}/T_5)$=3.67, satisfying equation (2), (2');

$(G_{23}/G_{12})$=6.70, satisfying equation (3), (3');

$(ALT/T_2)$=8.17, satisfying equation (4), (4');

wherein the distance from the object side surface 211 of the first lens element 210 to the image plane 270 is 4.50 (mm) and the length of the optical imaging lens 2 is shortened.

As shown in FIG. 7, the optical imaging lens 2 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 2 is effectively shortened.

Figure 10:
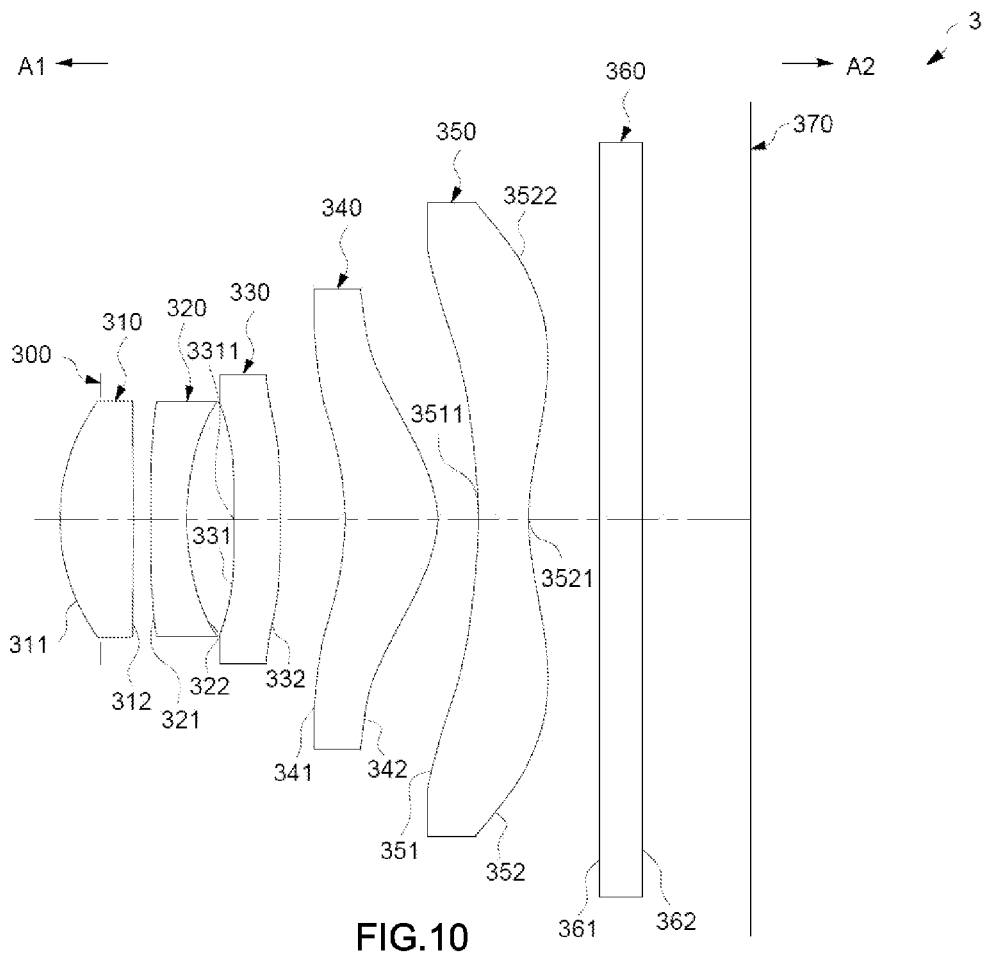
FIG. 10 is a cross-sectional view of a third embodiment of an optical imaging lens having five lens elements according to the present disclosures.
Figure 11:
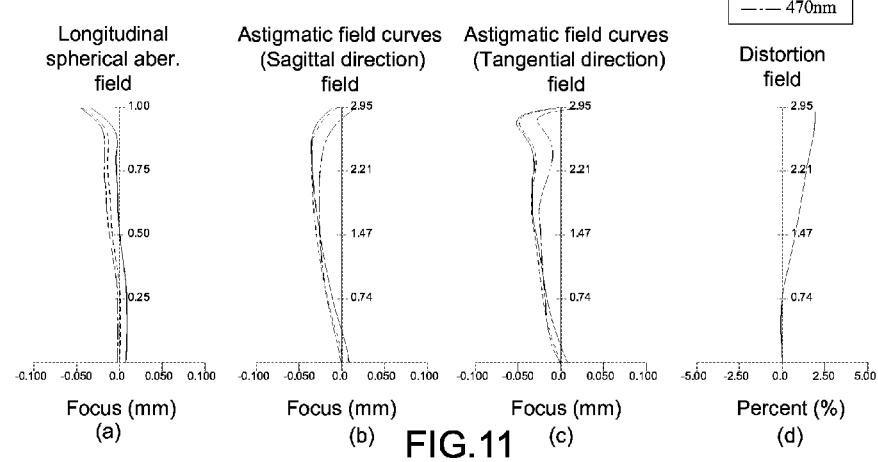
FIG. 11 is a chart of longitudinal spherical aberration and other kinds of optical aberrations of a third embodiment of the optical imaging lens according the present disclosures.

Reference is now made to FIGS. 10-13. FIG. 10 illustrates an example cross-sectional view of an optical imaging lens 3 having five lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 311 for labeling the convex object-side surface of the first lens element, reference number 312 for labeling the convex image-side surface of the first lens element, etc.

As shown in FIG. 10, the optical imaging lens 3 of the present embodiment, in an order from an object side A1 to an image side A2, comprises an aperture stop 300, a first lens element 310, a second lens element 320, a third lens element 330, a fourth lens element 340, and a fifth lens element 350. A filtering unit 360 and an image plane 370 of an image sensor are positioned at the image side A2 of the optical lens 2. Each of the first, second, third, fourth, fifth lens elements 310, 320, 330, 340, 350 and the filtering unit 360 has an object-side surface 311/321/331/341/351/361 facing toward the object side A1 and an image-side surface 312/322/332/342/352/362 facing toward the image side A2. The example embodiment of the filtering unit 360 illustrated is an IR cut filter (infrared cut filter) positioned between the fifth lens element 350 and an image plane 370. The filtering unit 360 filters light with specific wavelength from the light passing optical imaging lens 3. For example, IR light is filtered, and this will prohibit the IR light which is not seen by human eyes from producing an image on the image plane 370.

The differences between the second embodiment and the first embodiment are the thickness of each lens element and the distance of each air gap. Please refer to FIG. 12 for the optical characteristics of each lens elements in the optical imaging lens 3 of the present embodiment, wherein the values of $G_{23}$–$G_{45}$, $G_{aa}/T_5$, $G_{23}/G_{12}$ and $ALT/T_2$ are:

$(G_{23}$–$G_{45})$=0.05 (mm), satisfying equation (1), (1");

$(G_{aa}/T_5)$=3.37, satisfying equation (2), (2');

$(G_{23}/G_{12})$=2.80, satisfying equation (3), (3');

$(ALT/T_2)$=8.15, satisfying equation (4), (4');

wherein the distance from the object side surface 311 of the first lens element 310 to the image plane 370 is 4.45 (mm) and the length of the optical imaging lens 3 is shortened.

As shown in FIG. 11, the optical imaging lens 3 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 3 is effectively shortened.

Figure 14:
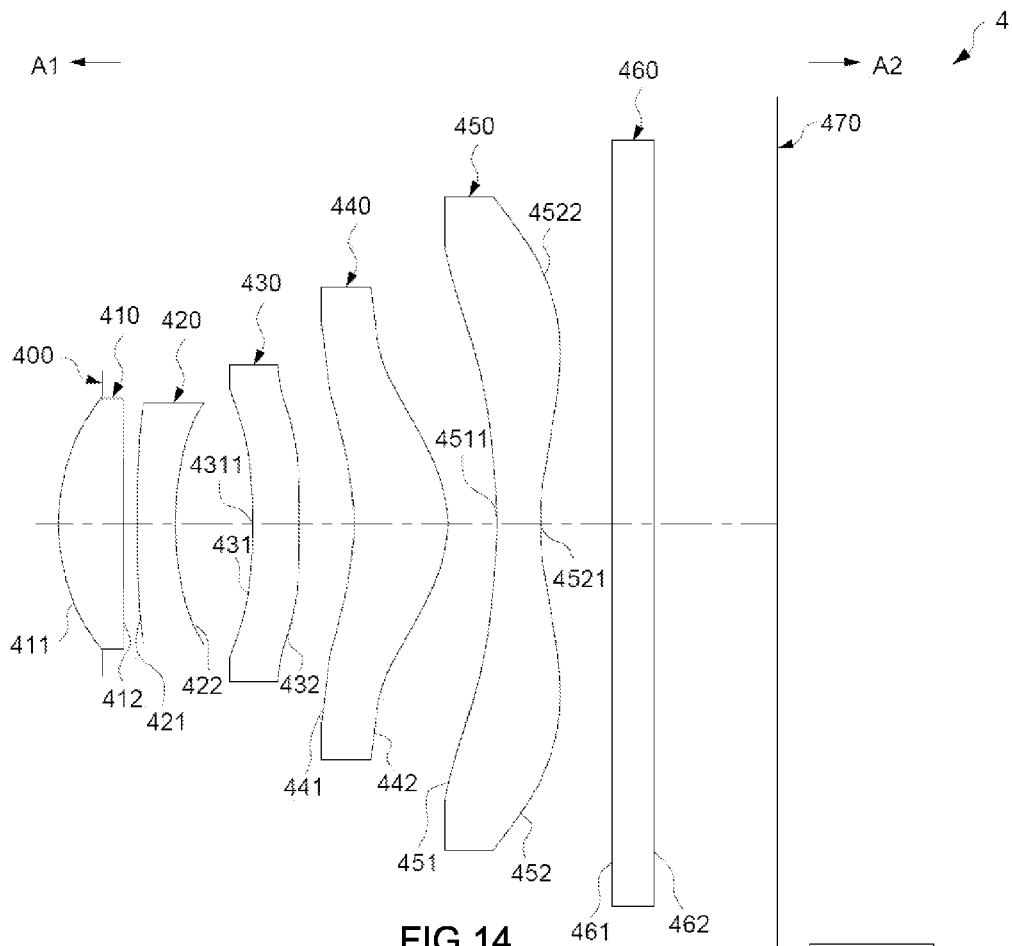
FIG. 14 is a cross-sectional view of a fourth embodiment of an optical imaging lens having five lens elements according to the present disclosures.
Figure 15:
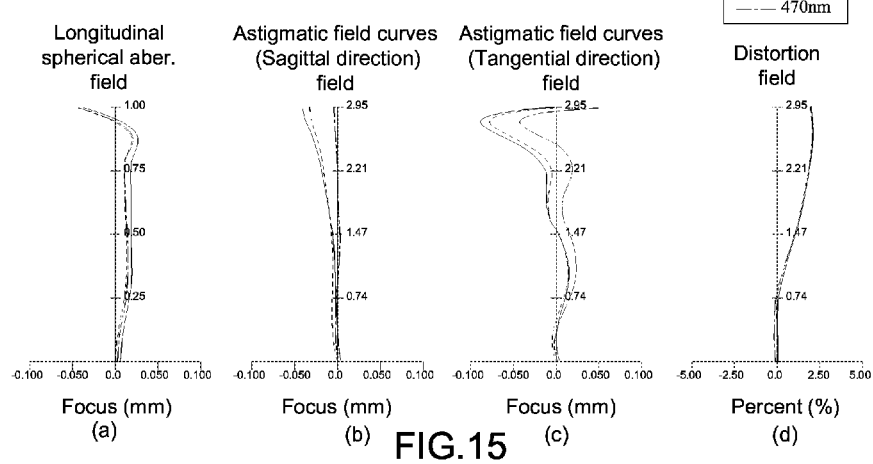
FIG. 15 is a chart of longitudinal spherical aberration and other kinds of optical aberrations of a fourth embodiment of the optical imaging lens according the present disclosures.

Reference is now made to FIGS. 14-17. FIG. 14 illustrates an example cross-sectional view of an optical imaging lens 4 having five lens elements of the optical imaging lens according to a fourth example embodiment. FIG. 15 shows example charts of longitudinal spherical aberration and other kinds of optical aberrations of the optical imaging lens 4 according to the fourth embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 411 for labeling the convex object-side surface of the first lens element, reference number 412 for labeling the convex image-side surface of the first lens element, etc.

As shown in FIG. 14, the optical imaging lens 4 of the present embodiment, in an order from an object side A1 to an image side A2, comprises an aperture stop 400, a first lens element 410, a second lens element 420, a third lens element 430, a fourth lens element 440, and a fifth lens element 450. A filtering unit 460 and an image plane 470 of an image sensor are positioned at the image side A2 of the optical lens 4. Each of the first, second, third, fourth, fifth lens elements 410, 420, 430, 440, 450 and the filtering unit 460 has an object-side surface 411/421/431/441/451/461 facing toward the object side A1 and an image-side surface 412/422/432/442/452/462 facing toward the image side A2. The example embodiment of the filtering unit 460 illustrated is an IR cut filter (infrared cut filter) positioned between the fifth lens element 450 and an image plane 470. The filtering unit 460 filters light with specific wavelength from the light passing optical imaging lens 4. For example, IR light is filtered, and this will prohibit the IR light which is not seen by human eyes from producing an image on the image plane 470.

The differences between the fourth embodiment and the first embodiment are the thickness of each lens element and the distance of each air gap. Please refer to FIG. 16 for the optical characteristics of each lens elements in the optical imaging lens 4 of the present embodiment, wherein the values of $G_{23}$–$G_{45}$, $G_{aa}/T_5$, $G_{23}/G_{12}$ and $ALT/T_2$ are:

$(G_{23}$–$G_{45})$=0.02 (mm), satisfying equation (1), (1");

$(G_{aa}/T_5)$=4.53, satisfying equation (2), (2');

$(G_{23}/G_{12})$=5.40, satisfying equation (3), (3');

$(ALT/T_2)$=7.69, satisfying equation (4), (4');

wherein the distance from the object side surface 411 of the first lens element 410 to the image plane 470 is 4.57 (mm) and the length of the optical imaging lens 4 is shortened.

As shown in FIG. 15, the optical imaging lens 4 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 4 is effectively shortened.

Figure 18:
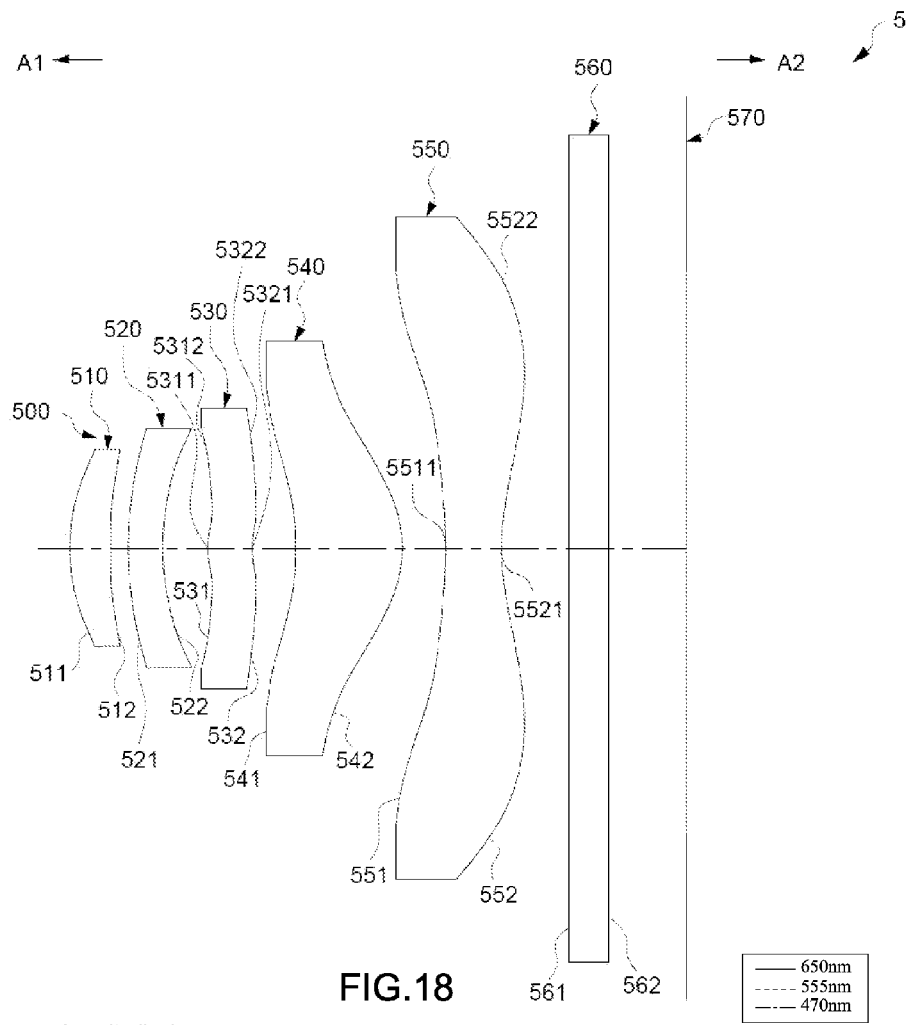
FIG. 18 is a cross-sectional view of a fifth embodiment of an optical imaging lens having five lens elements according to the present disclosures.
Figure 19:
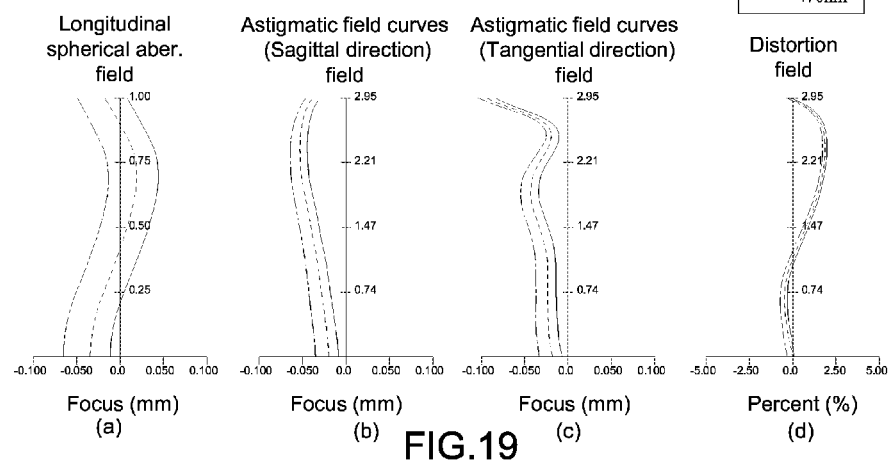
FIG. 19 is a chart of longitudinal spherical aberration and other kinds of optical aberrations of a fifth embodiment of the optical imaging lens according the present disclosures.

Reference is now made to FIGS. 18-21. FIG. 18 illustrates an example cross-sectional view of an optical imaging lens 5 having five lens elements of the optical imaging lens according to a fifth example embodiment. FIG. 19 shows example charts of longitudinal spherical aberration and other kinds of optical aberrations of the optical imaging lens 5 according to the fifth embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 511 for labeling the convex object-side surface of the first lens element, reference number 512 for labeling the concave image-side surface of the first lens element, etc.

As shown in FIG. 18, the optical imaging lens 5 of the present embodiment, in an order from an object side A1 to an image side A2, comprises an aperture stop 500 positioned in front of a first lens element 510, a second lens element 520, a third lens element 530, a fourth lens element 540, and a fifth lens element 550. A filtering unit 560 and an image plane 570 of an image sensor are positioned at the image side A2 of the optical lens 5. Each of the first, second, third, fourth, fifth lens elements 510, 520, 530, 540, 550 and the filtering unit 560 has an object-side surface 511/521/531/541/551/561 facing toward the object side A1 and an image-side surface 512/522/532/542/552/562 facing toward the image side A2. The example embodiment of the filtering unit 560 illustrated is an IR cut filter (infrared cut filter) positioned between the the fifth lens element 550 and an image plane 570. The filtering unit 560 filters light with specific wavelength from the light passing optical imaging lens 5. For example, IR light is filtered, and this will prohibit the IR light which is not seen by human eyes from producing an image on the image plane 570.

The differences between the fifth embodiment and the first embodiment are the thickness of each lens element, the distance of each air gap, and the curve shape, such as the image-side surface 512 of the first lens element 510 and the object-side and image-side surfaces 531, 532 of the third lens element 530. The image-side surface 512 of the first lens element 510 is a concave surface. The object-side surface 531 of the third lens element 530 has a convex portion 5311 in a vicinity of the optical axis and a concave portion 5312 in a vicinity of a periphery of the fifth lens element 530, and the image-side surface 532 of the third lens element 530 has a concave portion 5321 in a vicinity of the optical axis and a convex portion 5322 in a vicinity of a periphery of the fifth lens element 530. Please refer to FIG. 20 for the optical characteristics of each lens elements in the optical imaging lens 5 of the present embodiment, wherein the values of $G_{23}$–$G_{45}$, $G_{aa}/T_5$, $G_{23}/G_{12}$ and ALT/$T_2$ are:

$(G_{23}-G_{45})$=0.04 (mm), satisfying equation (1), (1");

$(G_{aa}/T_5)$=2.61, satisfying equation (2), (2');

$(G_{23}/G_{12})$=3.37, satisfying equation (3), (3');

$(ALT/T_2)$=8.16, satisfying equation (4), (4');

wherein the distance from the object side surface 511 of the first lens element 510 to the image plane 570 is 4.26 (mm) and the length of the optical imaging lens 5 is shortened.

As shown in FIG. 19, the optical imaging lens 5 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 5 is effectively shortened.

Figure 22:
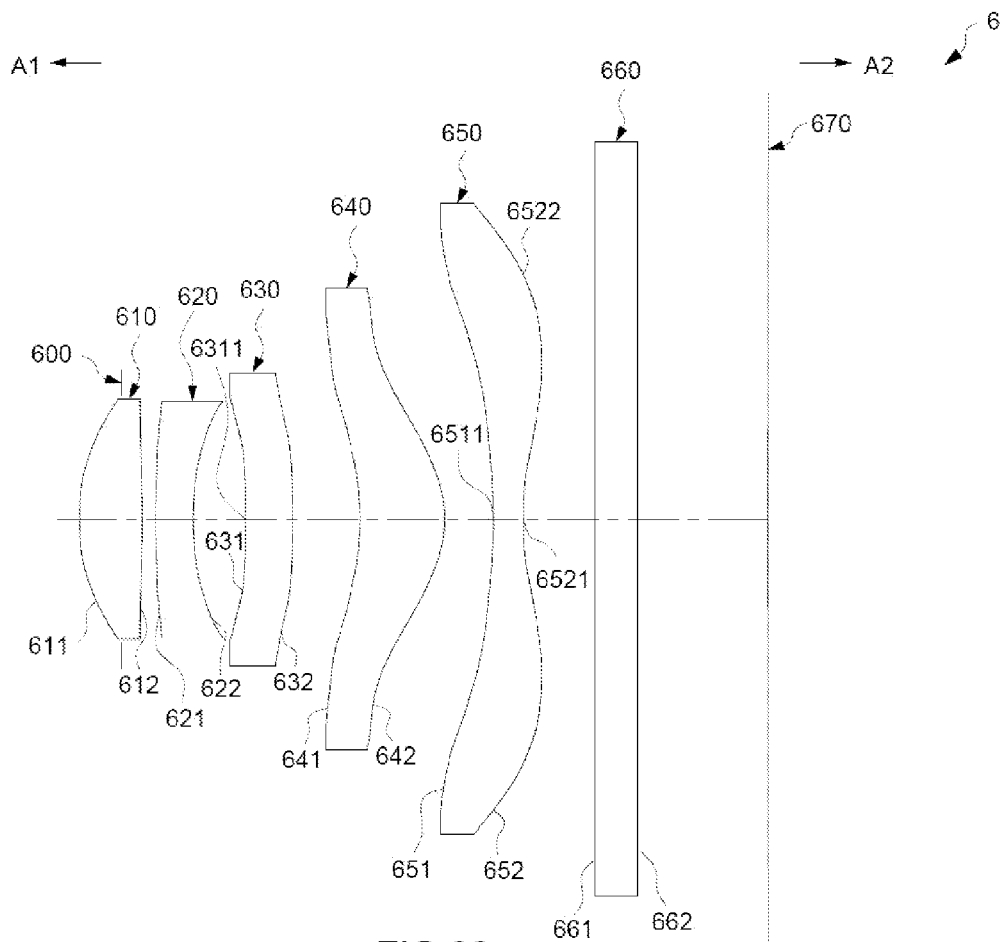
FIG. 22 is a cross-sectional view of a sixth embodiment of an optical imaging lens having five lens elements according to the present disclosures.
Figure 23:
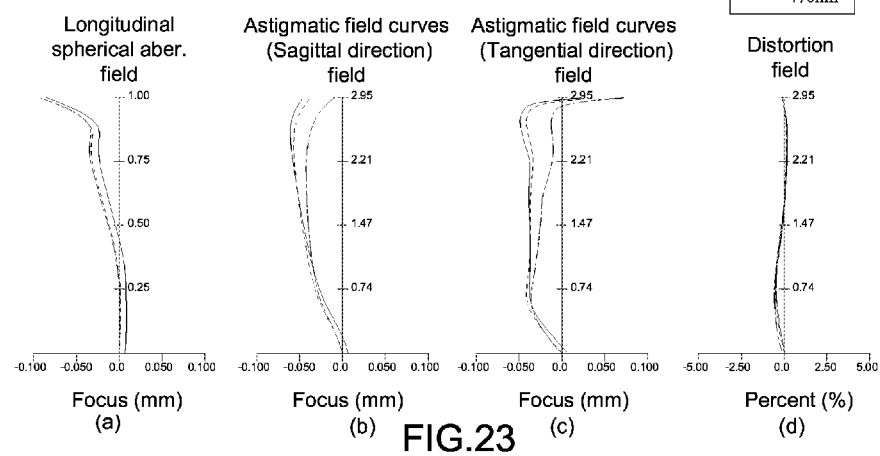
FIG. 23 is a chart of longitudinal spherical aberration and other kinds of optical aberrations of a sixth embodiment of the optical imaging lens according the present disclosures.

Reference is now made to FIGS. 22-25. FIG. 22 illustrates an example cross-sectional view of an optical imaging lens 6 having five lens elements of the optical imaging lens according to a sixth example embodiment. FIG. 23 shows example charts of longitudinal spherical aberration and other kinds of optical aberrations of the optical imaging lens 6 according to the sixth embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 611 for labeling the convex object-side surface of the first lens element, reference number 612 for labeling the convex image-side surface of the first lens element, etc.

As shown in FIG. 22, the optical imaging lens 6 of the present embodiment, in an order from an object side A1 to an image side A2, comprises an aperture stop 600, a second lens element 620, a third lens element 630, a fourth lens element 640, and a fifth lens element 650. A filtering unit 660 and an image plane 670 of an image sensor are positioned at the image side A2 of the optical lens 6. Each of the first, second, third, fourth, fifth lens elements 610, 620, 630, 640, 650 and the filtering unit 660 has an object-side surface 611/621/631/641/651/661 facing toward the object side A1 and an image-side surface 612/622/632/642/652/662 facing toward the image side A2. The example embodiment of the filtering unit 660 illustrated is an IR cut filter (infrared cut filter) positioned between the fifth lens element 650 and an image plane 670. The filtering unit 660 filters light with specific wavelength from the light passing optical imaging lens 6. For example, IR light is filtered, and this will prohibit the IR light which is not seen by human eyes from producing an image on the image plane 670.

The differences between the sixth embodiment and the first embodiment are the thickness of each lens element and the distance of each air gap. Please refer to FIG. 24 for the optical characteristics of each lens elements in the optical imaging lens 6 of the present embodiment, wherein the values of $G_{23}$–$G_{45}$, $G_{aa}/T_5$, $G_{23}/G_{12}$ and ALT/$T_2$ are:

$(G_{23}-G_{45})$=0.03 (mm), satisfying equation (1), (1");

$(G_{aa}/T_5)$=6.27, satisfying equation (2), (2');

$(G_{23}/G_{12})$=3.62, satisfying equation (3), (3');

$(ALT/T_2)$=6.99, satisfying equation (4), (4');

wherein the distance from the object side surface 611 of the first lens element 610 to the image plane 670 is 4.35 (mm) and the length of the optical imaging lens 6 is shortened.

As shown in FIG. 23, the optical imaging lens 6 of the present embodiment shows great characteristics in longitudinal spherical aberration (a), astigmatism in the sagittal direction (b), astigmatism in the tangential direction (c), and distortion aberration (d). Therefore, according to the above illustration, the optical imaging lens of the present embodiment indeed shows great optical performance and the length of the optical imaging lens 6 is effectively shortened.

Please refer to FIG. 26, which shows the values of $G_{23}$–$G_{45}$, $G_{aa}/T_5$, $G_{23}/G_{12}$ and ALT/$T_2$ of all six embodiments, and it is clear that the optical imaging lens of the present invention satisfy the Equations (1)/(1')/(1"), (2)/(2'), (3)/(3'), (4)/(4').

Figure 27:
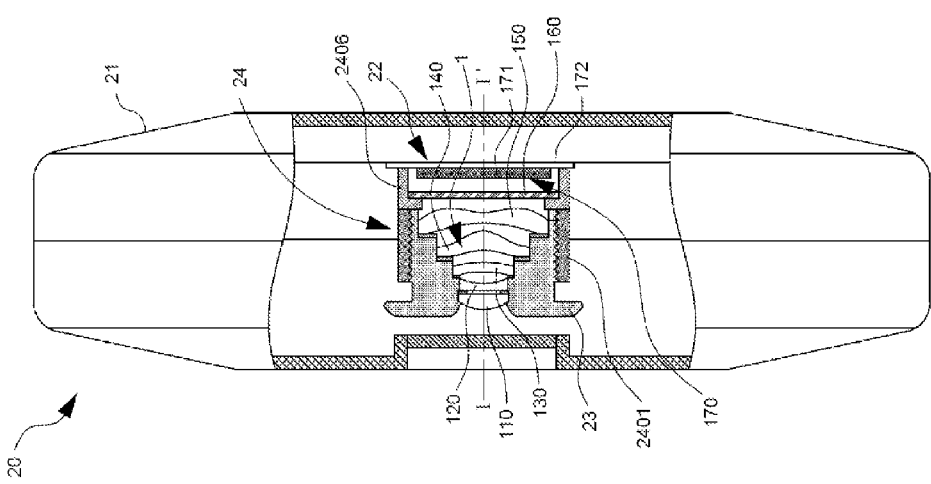
FIG. 27 is a structure of an example embodiment of a mobile device.

Reference is now made to FIG. 27, which illustrates an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

As shown in FIG. 27, the photography module 22 may comprise an aforesaid optical imaging lens with five lens elements, for example the optical imaging lens 1 of the first embodiment, a lens barrel 23 for positioning the optical imaging lens 1, a module housing unit 24 for positioning the lens barrel 23, and an image sensor 171 which is positioned at an image side of the optical imaging lens 1. The image plane 170 is formed on the image sensor 171.

In some other example embodiments, the structure of the filtering unit 160 may be omitted. In some example embodiments, the housing 21, the lens barrel 23, and/or the module housing unit 24 may be integrated into a single component or assembled by multiple components. In some example embodiments, the image sensor 171 used in the present embodiment is directly attached to a substrate 172 in the form of a chip on board (COB) package, and such package is different from traditional chip scale packages (CSP) since COB package does not require a cover glass before the image sensor 171 in the optical imaging lens 1. Aforesaid exemplary embodiments are not limited to this package type and could be selectively incorporated in other described embodiments.

The five lens elements 110, 120, 130, 140, 150 are positioned in the lens barrel 23 in the way of separated by an air gap between any two adjacent lens elements.

The module housing unit 24 comprises a lens backseat 2401 and an image sensor base 2406 positioned between the lens backseat 2401 and the image sensor 171. The lens barrel 23 and the lens backseat 2401 are positioned along a same axis I-I', and the lens barrel 23 is positioned inside the lens backseat 2401.

Because the length of the optical imaging lens 1 is merely 4.56 (mm), the size of the mobile device 20 may be quite small. Therefore, the embodiments described herein meet the market demand for smaller sized product designs.

Figure 28:
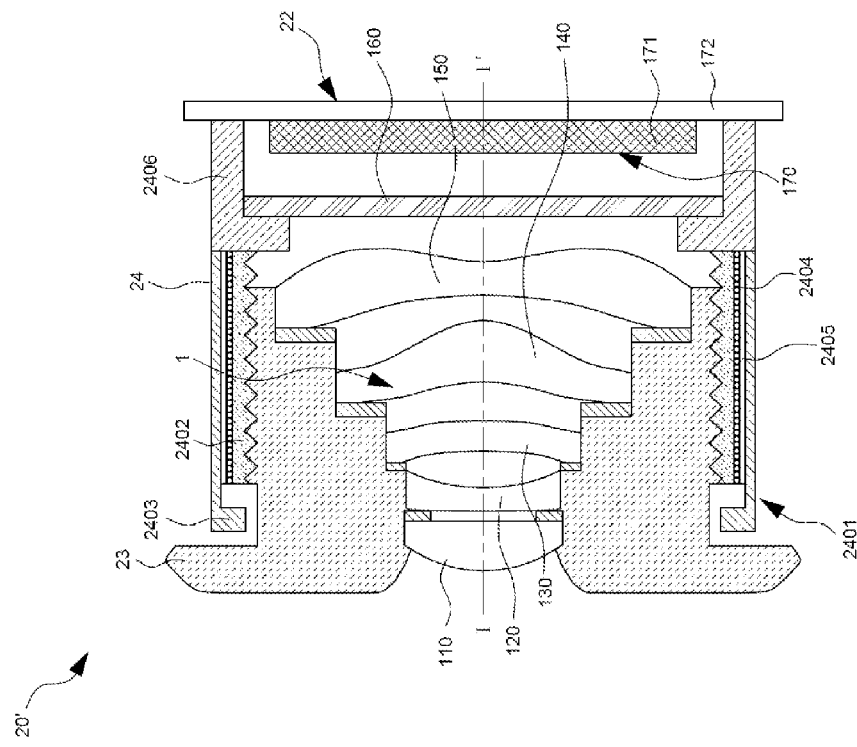
FIG. 28 is a partially enlarged view of the structure of another example embodiment of a mobile device.

Reference is now made to FIG. 28, which shows another structural view of a second embodiment of mobile device 20' applying the aforesaid optical imaging lens 1. One difference between the mobile device 20' and the mobile device 20 may be the lens backseat 2401 comprises a first seat element 2402, a second seat element 2403, a coil 2404, and a magnetic unit 2405. The first seat element 2402 is close to the outside of the lens barrel 23, and positioned along an axis I-I', and the second seat element 2403 is around the outside of the the first seat element 2402 and positioned along with the axis I-I'. The coil 2404 is positioned between the first seat element 2402 and the inside of the second seat element 2403. The magnetic unit 2405 is positioned between the outside of the coil 2404 and the inside of the second seat element 2403.

The lens barrel 23 and the optical imaging lens 1 positioned therein are driven by the first seat element 2402 for moving along the axis I-I'. The sensor backseat 2406 is close to the second seat element 2403. The filtering unit 160, for example IR cut, is positioned on the sensor backseat 2406. The rest structure of the mobile device 20' is similar to the mobile device 20.

Similarly, because the length of the optical imaging lens 1, 4.56 (mm), is shortened, the mobile device 20' may be designed with a smaller size and meanwhile good optical performance is still provided. Therefore, the present embodiment meets the demand of small sized product design and the request of the market.

According to above illustration, it is clear that the mobile device and the optical imaging lens thereof in example embodiments, through controlling ratio of at least one central thickness of lens element to a sum of all air gaps along the optical axis between five lens elements in a predetermined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:
1. An optical imaging lens comprising,
sequentially from an object side to an image side, an aperture stop, first, second, third, fourth and fifth lens elements, each of said first, second, third, fourth and fifth lens elements having an object-side surface facing toward the object side and an image-side surface facing toward the image side, wherein:
said first lens element has positive refracting power, and said object-side surface thereof is a convex surface;
said second lens element has negative refracting power;
said third lens element has positive refracting power;
said image-side surface of said fourth lens element is a convex surface;
said object-side surface of said fifth lens element comprises a concave portion in a vicinity of the optical axis, and said image-side surface of said fifth lens element comprises a concave portion in a vicinity of the optical axis and a convex portion in a vicinity of a periphery of the fifth lens element; and
lens as a whole has only the five lens elements having refracting power,
wherein an air gap between the second lens element and the third lens element along the optical axis is $G_{23}$, an air gap between the first lens element and the second lens element along the optical axis is $G_{12}$ and $G_{23}$ and $G_{12}$ satisfy the equation:

$$2 \leq \frac{G_{23}}{G_{12}} \leq 7.5.$$

2. The optical imaging lens according to claim 1, wherein an air gap between the second lens element and the third lens element along the optical axis is $G_{23}$, and an air gap between the fourth lens element and the fifth lens element along the optical axis is $G_{45}$, and $G_{23}$ and $G_{45}$ satisfy the equation:

$0 < G_{23} - G_{45}$ (mm)

3. The optical imaging lens according to claim 2, wherein $G_{23}$ and $G_{45}$ further satisfy the equation:

$0.1 \leq G_{23} - G_{45}$ (mm)

4. The optical imaging lens according to claim 3, wherein the object-side surface of the third lens element comprises a concave portion in a vicinity of the optical axis.

5. The optical imaging lens according to claim 2, wherein $G_{23}$ and $G_{45}$ further satisfy the equation:

$0 \leq G_{23} - G_{45} \leq 0.2$ (mm)

6. The optical imaging lens according to claim 5, wherein the object-side surface of the third lens element comprises a concave portion in a vicinity of the optical axis.

7. The optical imaging lens according to claim 2, wherein the sum of all four air gaps from the frist lens element to the fifth lens element along the optical axis is $G_{aa}$, a central thickness of the fifth lens element along the optical axis is $T_5$, and $G_{aa}$ and $T_5$ satisfy the equation:

$$2.3 \leq \frac{G_{aa}}{T_5}.$$

8. The optical imaging lens according to claim 7, wherein the sum of the thickness of all five lens elements along the optical axis is ALT, a central thickness of the second lens element along the optical axis is $T_2$, and ALT and $T_2$ satisfy the equations:

$$6.5 \leq \frac{ALT}{T_2},$$

and $$2.6 \leq \frac{G_{aa}}{T_5}.$$

9. The optical imaging lens according to claim 7, wherein the object-side surface of the third lens element comprises a concave portion in a vicinity of the optical axis.

10. The optical imaging lens according to claim 1, wherein the object-side surface of the third lens element comprises a concave portion in a vicinity of the optical axis.

11. A mobile device, comprising:
a housing; and
a photography module positioned in the housing and comprising:
the optical imaging lens as claimed in claims 1;
a lens barrel for positioning the optical imaging lens;
a module housing unit for positioning the lens barrel; and
an image sensor positioned at the image side of the optical imaging lens.

12. The mobile device according to claim 11, wherein the module housing unit comprises a lens backseat comprising a first seat element and a second seat element, the first seat element is positioned close to the outside of the lens barrel and along with an axis for driving the lens barrel and the optical imaging lens positioned therein to move along the axis, and the second seat element is positioned along the axis and around the outside of the lens seat.

13. The mobile device according to claim 12, wherein the module housing unit further comprises an image sensor base positioned between the second seat element and the image sensor, and the image sensor base is closed to the second seat element.

* * * * *